(12) United States Patent
Fenton (10) Patent No.: US 8,633,854 B2
(45) Date of Patent: Jan. 21, 2014

(54) SHORT AND ULTRA-SHORT BASELINE PHASE MAPS

(75) Inventor: Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 430 days.

(21) Appl. No.: 12/579,481

(22) Filed: Oct. 15, 2009

(65) Prior Publication Data

US 2011/0090113 A1    Apr. 21, 2011

(51) Int. Cl.
*G01S 19/54* (2010.01)
(52) U.S. Cl.
CPC ....................................... *G01S 19/54* (2013.01)
USPC ..................................................... 342/357.37
(58) Field of Classification Search
CPC ........................................................ G01S 19/54
USPC ........................................ 342/357.36, 357.37
See application file for complete search history.

(56) References Cited

U.S. PATENT DOCUMENTS

| | | | |
|---|---|---|---|
| 5,101,356 A * | 3/1992 | Timothy et al. | 701/213 |
| 5,534,875 A | 7/1996 | Diefes et al. | |
| 6,023,240 A * | 2/2000 | Sutton | 342/357.37 |
| 6,088,653 A | 7/2000 | Sheikh et al. | |
| 6,211,821 B1 | 4/2001 | Ford | |
| 6,441,779 B1 * | 8/2002 | Bennett et al. | 342/357.36 |
| 6,677,885 B1 | 1/2004 | Frankot | |
| 7,298,325 B2 * | 11/2007 | Krikorian et al. | 342/359 |
| 7,358,893 B2 | 4/2008 | O'Brien | |
| 2006/0012516 A1 | 1/2006 | Ford et al. | |
| 2009/0164067 A1 | 6/2009 | Whitehead et al. | |

FOREIGN PATENT DOCUMENTS

WO  WO 2006/026016 A2   3/2006

OTHER PUBLICATIONS

Comp, C. et al, "Adaptive SNR-Based Carrier Phase Multipath Mitigation Technique," IEEE Trans. on Aerospace and Electronic Systems, vol. 34, No. 1, Jan. 1998, pp. 264-276.*
Sutton, Eric. "Calibration of Differential Phase Map Compensation Using Single Axis Rotation," Proc. Of the 11 Int'l Tech. Metting of the Satellite Division of ION, Sep. 1998, pp. 1-16.*

(Continued)

*Primary Examiner* — Gregory C Issing
(74) *Attorney, Agent, or Firm* — Cesari and McKenna, LLP; Patricia A. Sheehan (57) ABSTRACT

A system for generating and utilizing a look-up mechanism consisting of one or more phase difference error maps, tables and/or mathematical models calculates the respective maps, tables and/or models by placing a short baseline or ultra-short baseline antenna array in a known location and known orientation, determining angles of incidence of incoming GNSS satellite signals with respect the antenna array and calculating expected carrier phase differences between respective pairs of antennas, calculating measured carrier phase differences between the respective pairs of antennas, and determining carrier phase difference errors using the expected and measured carrier phase differences. The carrier phase difference errors are then recorded in the look-up mechanism, with the maps and, as appropriate, look-up tables for the respective pairs of antennas being indexed by angles of incidence. Thereafter, the system utilizes the look-up mechanism when determining the unknown orientation of the antenna structure. For respective pairs of antennas, the system enters the look-up mechanism based on angles of incidence determined from a calculated orientation, and uses the retrieved values in the calculation of a corrected orientation, to compensate for phase distortion.

28 Claims, 7 Drawing Sheets

(56) References Cited

OTHER PUBLICATIONS

Kim, Ung Suok et al. "Precise Phase Calibration of a Controlled Reception Pattern GPS Antenna for JPALS," IEEE PLANS 04, 2004, 9 pages.*

Kim, Ung Suok et al. "Phase Effects Analysis of Patch Antenna CRPAs for JPALS," ION GNSS 17th Int'l Tech. Meeting of the Satellite Division, Sep. 2004, pp. 1531-1538.*

* cited by examiner

SHORT AND ULTRA-SHORT BASELINE PHASE MAPS

BACKGROUND OF THE INVENTION

1. Field of the Invention

This invention relates generally to global navigation satellite systems (GNSS) and more particularly to short baseline receivers.

2. Background Information

Short baseline real time kinematic (RTK) systems typically operate with a base GNSS receiver and a rover GNSS receiver that are separated by a small number of kilometers, for example, less than 10 kilometers. The base receiver, which is in a known position, makes carrier phase measurements using GNSS signals transmitted from GNSS satellites in view and calculates pseudoranges from the respective satellites. The base receiver then determines differences between the pseudoranges calculated using the satellite signals and the ranges based on the known position of the receiver and the known locations of the satellites, to determine range correction information. The base receiver operating in a known manner broadcasts the RTK information, that is, the range correction information, pseudoranges, carrier phase measurements and various other information.

The rover receiver utilizes the broadcast pseudoranges, carrier phase measurements and other information to solve for integer carrier cycle ambiguities using well known, processing intensive, operations. The rover receiver utilizes the range correction information to correct for pseudorange errors related to changes in satellite orbits, atmospheric conditions, and so forth, that affect both the base receiver and the rover receiver in the same manner due to the short baseline between the receivers, all in a known manner.

Certain short baseline systems utilize fixed baselines that may, for example, employ two antennas situated at the rover receiver to determine the orientation or azimuth of the rover receiver. The antennas may be fixed to a vehicle, such as an automobile or a ship, and may, for example, be spaced apart by as little as 1 to ½ meter. The multiple antennas provide information that is utilized in well known short baseline RTK processing operations to resolve carrier cycle ambiguities for the respective antennas. Once the carrier cycle ambiguities are resolved, the system can then determine the azimuth or orientation of the vehicle based on the differences in the carrier phases at the two antennas.

The fixed baseline systems suffer from the adverse effects of multipath and biases introduced by receiver operations. The signals received at each antenna may be affected in the same or different manners by the multipath signals. Further, the multipath signals may also differ across the GNSS satellites and at different times, depending on the locations of the respective GNSS satellites. The line biases may differ also, depending on the ambient environment, and so forth.

A co-pending application Ser. No. 12/579,460 entitled Ultra-Short Baseline GNSS Receiver, that is filed on even date herewith and assigned to a common Assignee and which is hereby incorporated herein in its entirety by reference, describes a system that utilizes two antennas that are spaced apart by less than one wavelength of the GNSS satellite carrier signal of interest. These antennas are referred to herein as being on an "ultra-short" fixed baseline. Such a system has the advantage that the integer carrier cycle ambiguities are not a problem between measurements made by the two antennas, and orientation or azimuth can be determined without the use of the processing intensive short base line RTK operations. However, the close proximity of the antennas may adversely affect the received signals due, for example, to cross-talk between the antennas.

SUMMARY

A short or ultra-short baseline system generates a corresponding phase map or table that associates carrier phase difference errors with the angles of incidence or arrival of the incoming GNSS satellites signals at the rover receiver antennas. The short baseline look-up mechanism provides compensating carrier phase difference corrections that are used in azimuth determination, to correct for phase distortions associated with multipath signals at the respective antennas and line biases associated with receiver operations. The ultra-short baseline phase map provides compensating carrier phase difference corrections that further correct for local Radio Frequency (RF) effects between the two closely spaced antennas on the ultra-short baseline.

The system generates the phase map and/or an associated phase difference error lookup table based on both expected phase differences and measured phase differences at the rover receiver antennas for GNSS satellite signals at respective angles of incidence. The system determines map grid sizes based on a gradient of the phase difference errors, with smaller grid sizes used for higher gradients. The grid size may also depend on user application accuracy requirements, with smaller grid sizes utilized with greater accuracy requirements. Alternatively, or in addition, multi-parameter mathematical models, such as spherical models, may be used to represent the difference errors instead of a lookup table. The phase map, lookup table and/or mathematical model are also referred to herein collectively as a "look-up mechanism."

BRIEF DESCRIPTION OF THE DRAWINGS

The present invention can be better understood with reference to the accompanying drawings, of which.

DETAILED DESCRIPTION OF AN ILLUSTRATIVE EMBODIMENT

Figure 1:
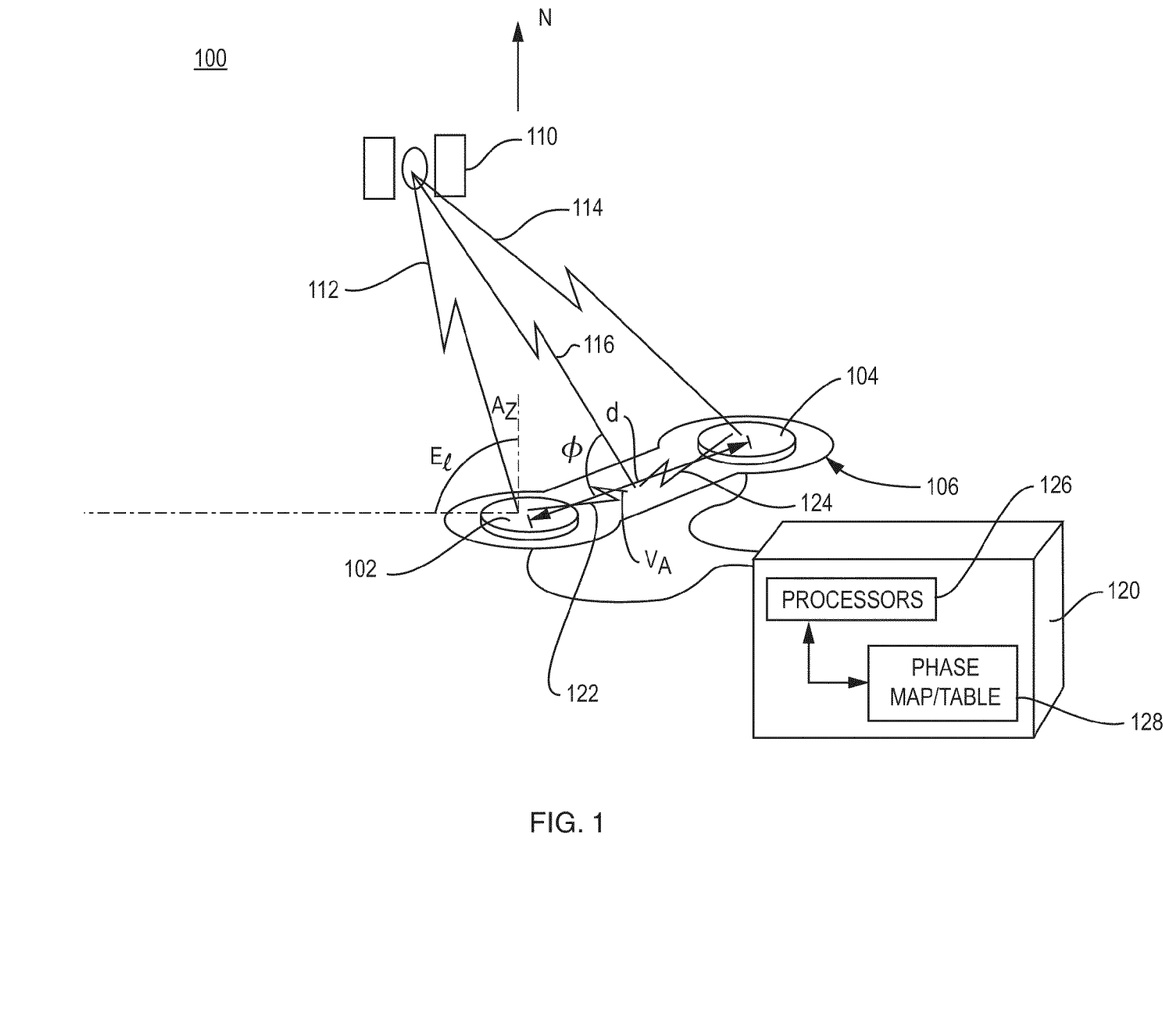
FIG. 1 is a schematic illustration of a dual antenna receiver constructed in accordance with the invention.

FIG. 1 is a schematic illustration of a short baseline receiver 120 that receives GNSS satellite signals transmitted by a GNSS satellite 110, in accordance with an illustrative embodiment of the present invention. More specifically, the system 100 of FIG. 1 includes dual antennas 102 and 104 that are shown mounted on a rigid frame 106. The antennas reside a relatively short distance apart, as illustrated by the dimension "d." The operations of the system are described for the dimension d greater than one wavelength of the GNSS signal and also for the dimension d less than one wavelength of the GNSS signal. Further, an array of more than two antennas may be utilized with each antenna a distance d from its neighbors. For ease of explanation the system is described as utilizing the dual antennas.

The GNSS satellite signal is represented schematically as signal path 112, which is received by antenna 102, and signal path 114, which is received by antenna 104. The lengths of the two paths differ because of the different locations of the respective antennas. The signals received by the dual antennas 102 and 104 are provided to the accompanying receiver equipment 120, which includes processors 126 that are programmed in accordance with the method of invention as described in further detail herein to produce and utilize an associated phase map and/or look-up table 128.

Once the map and/or lookup table 128 are generated, the receiver 120 utilizes compensating phase difference corrections retrieved therefrom in azimuth calculations, to provide more accurate azimuth or orientation information. The more accurate azimuth information may allow the system to initialize associated gyroscopes and/or other inertial senses (not shown) more quickly, in particular when the ultra-short baseline antennas are utilized as discussed in more detail below. Further, since the ultra-short baseline system consistently provides direction information with zero mean error, less expensive gyroscopes may be utilized without adversely affecting the accuracy of direction or heading information provided to a user.

As will be understood by those skilled in the art, the receiver 120 tracks the GNSS satellite signal carrier at the two antennas 102 and 104, and determines phase differences that are used to calculate the orientation of the antennas. The receiver also calculates angles of incidence, $\theta$, of the GNSS satellite signals with respect to the orientation of the antennas, that is, with respect to a vector $V_A$ that extends between the phase centers of the two antennas. In one example, the azimuth, denoted Az in the drawing and defined with respect to true North, and the elevation angle, denoted El in the drawing and defined with respect to the horizon, may be determined for both the incoming satellite signal and the vector $V_A$ based on the satellite position coordinates and an estimated or known orientation of the antennas.

In addition to the GNSS satellite signals, the antennas 102 and 104 also receive multipath signals 122 and 124, which are reflections of satellite signals 116 from, for example, the frame 106. Further, receiver operations may introduce line biases and so forth that adversely affect the carrier phase measurements. It is therefore advantageous to adjust for the effects of these erroneous signals and biases when determining the orientation of the antennas in accordance with the invention.

More specifically, a satellite signal approaching the rigid frame 106 at a specific angle of incidence will have the essentially same phase distortion every time the satellite signal is coming from the same angle of incidence. In such situations, for example, the incoming signals result in the same or essentially the same multipath signals at the respective antennas. The line biases, however, are the same across the GNSS satellites and may instead vary based on ambient temperature or other factors. By appropriately determining the carrier phase difference errors associated with the satellite signals received at the antennas from a plurality of incident angles, the system generates a phase map, table 128 and/or mathematical model (not shown) for use in compensating for the phase distortion. The system thus need not attempt to solve for carrier phase measurement errors at each of the antennas in order to obtain more precise orientation information.

The measured phase difference between two antennas separated by a fixed and known offset is estimated from the following equations:

$$d\sigma = \frac{L\cos\varphi}{\lambda} + B_L \qquad \text{eqn. 1}$$

where $d\sigma$ is the expected phase angle difference, $\lambda$ is the wavelength of the GNSS carrier signal, L is the distance between the antenna phase centers, $\phi$ is the angle between vector $V_A$ and the incoming satellite signal, and $B_L$ is the RF electrical line bias between the circuitry associated with the respective antennas.

Assuming the approximate location of the closely-spaced antennas can be determined, the direction of the incoming GNSS satellite signal can be ascertained from the broadcast data on the satellite signal. The $\cos \phi$ term of eqn. 1 can then be calculated using the cosine dot product:

$$\cos\phi = ax+by+cz$$

where (ai+bj+ck) is the unit vector of the incoming signal from the GNSS satellite signal, and (xi+yj+zk) is the unit vector of the vector $V_A$ that joins the antenna phase centers. In the calculation, $$a=\cos(Az_s)\cos(El_s)$$

$$b=\sin(Az_s)\cos(El_s)$$

$$c=\sin(El_s)$$

where the subscript "s" indicates the angles are with respect to the satellite signal and Az and El represent azimuth with respect to North and elevation angle with respect to the horizon, respectively. Further:

$$x=\cos(Az_A)\cos(El_A)$$

$$y=\sin(Az_A)\cos(El_A)$$

$$z=\sin(El_A)$$

where the subscript "A" indicates the angles are with respect to the vector $V_A$. As will be appreciated, other known calculations may be used to determine the angle of incidence between the incoming satellite signal and the vector $V_A$ based on the known position of the GNSS satellite and the known or an estimated orientation of the antenna baseline.

The line bias $B_L$ is common to all GNSS signals received by the two antennas. Accordingly, the line bias can be determined by, for example, adjusting the carrier phase differences to remove or essentially equate the geometries for various incoming satellite signals, such that the line bias term is the same across the calculations. Alternatively, the line bias may be determined from measurements taken when a given satellite is positioned at a 90 degree angle with respect to the vector $V_A$, which is when the carrier phase difference should otherwise be zero.

Figure 2A:
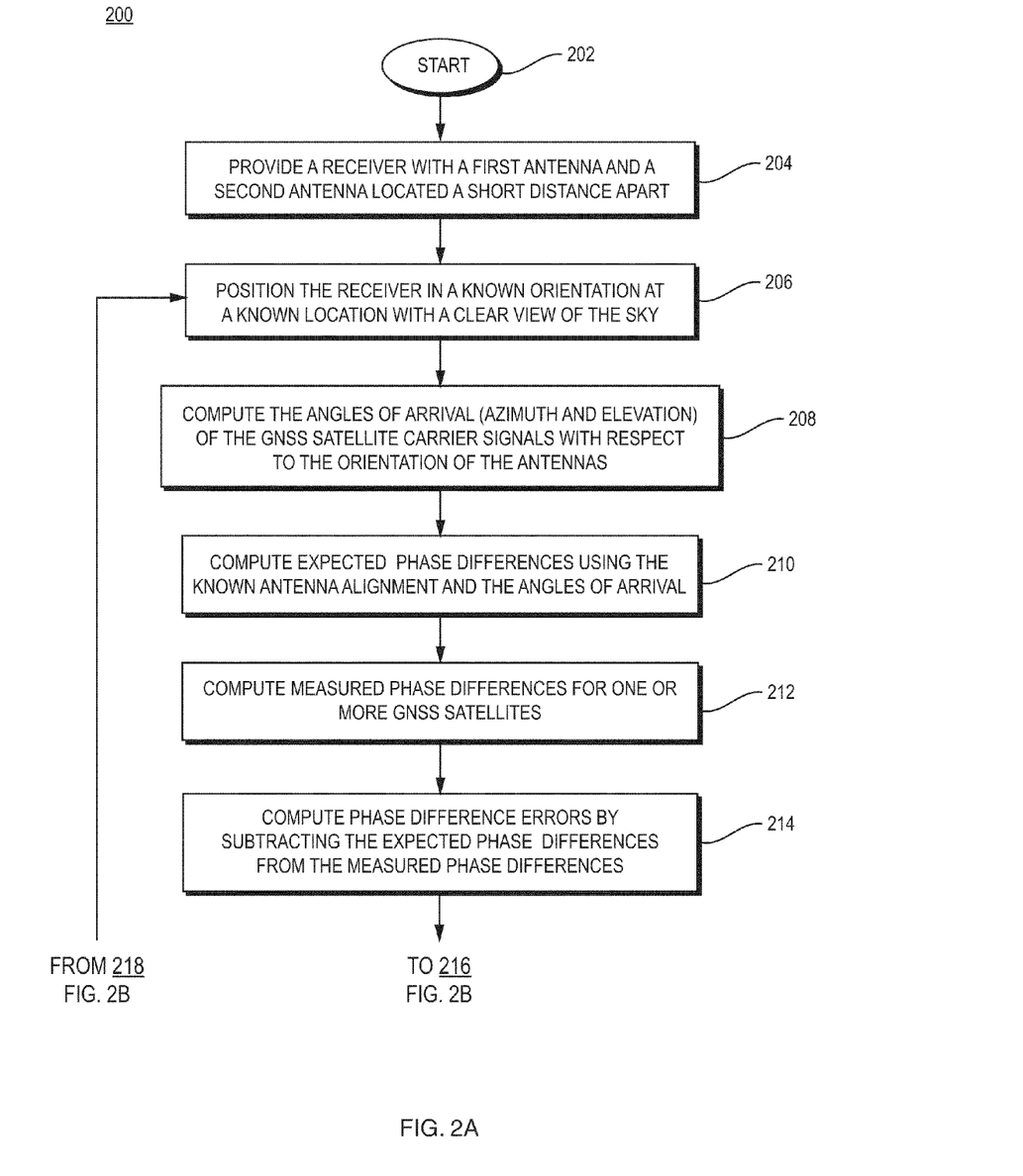
FIGS. 2A and 2B are a flow chart of a procedure for generating the phase map/look-up table of FIG. 1.
Figure 2B:
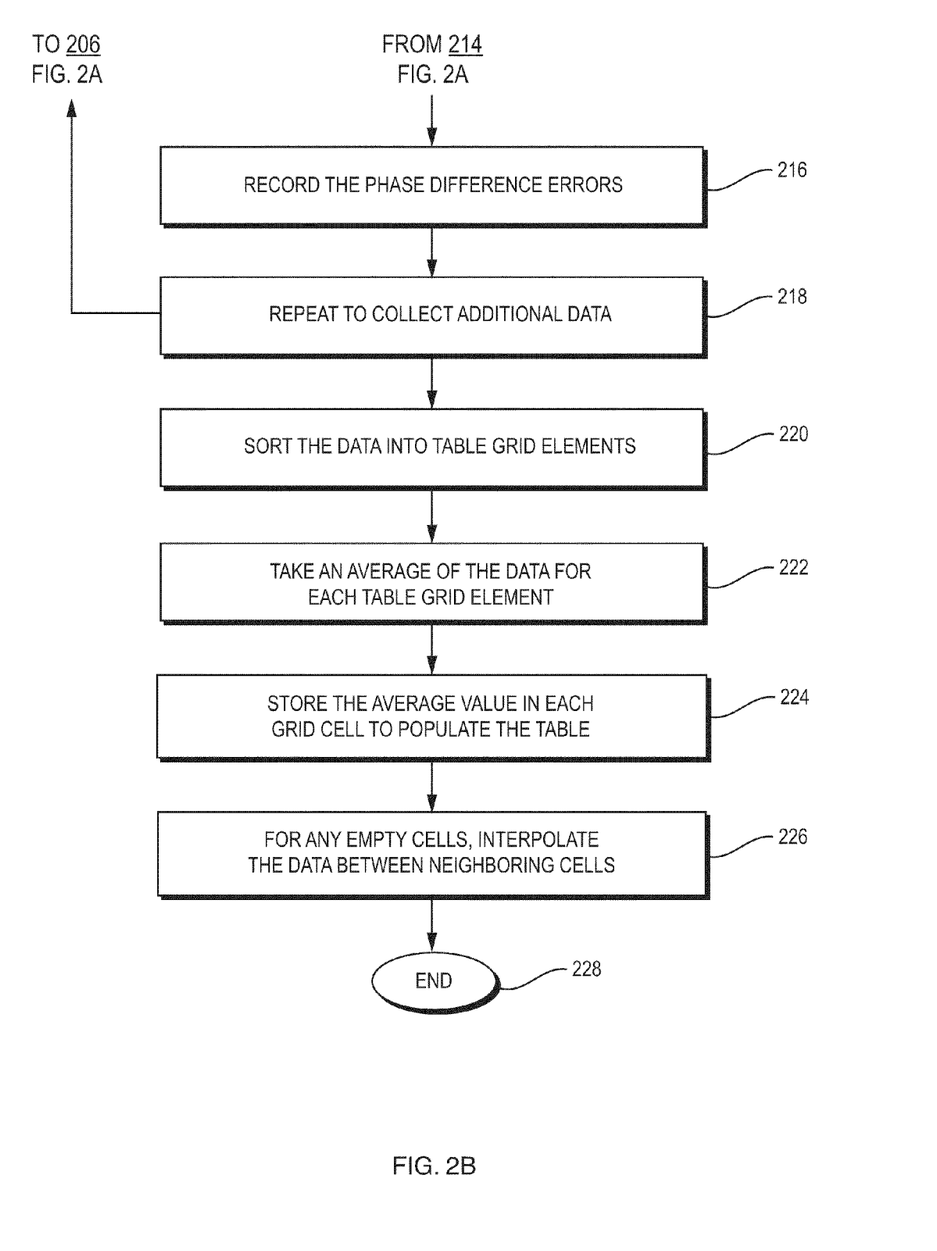

The line bias may be incorporated into the look-up mechanism, assuming the bias is stable. However, component tolerances to temperature change and aging may result in instability in the line bias, and thus, the term $B_L$ may require periodic recalculation. Accordingly, the term may instead be calculated at appropriate times and incorporated separately into the azimuth or orientation calculations. Alternatively, pairs of phase difference measurements could be differenced, with the line bias terms cancelling in the double-difference phase observations. Processing double-difference phase observations for RTK baselines is well known in the art to remove biases related to the different clocks in the respective receivers, and so forth. In this system, however, the double-differencing removes the line biases associated with the respective antennas at the same receiver. While simplifying the calculations, the trade-off is the double differencing introduces some Gaussian noise into the calculations, FIGS. 2A and 2B are a flow chart of a procedure for generating the phase map and/or look-up table 128 in accordance with the illustrative embodiment of the present invention. The procedure begins at the start step 202 and continues to step 204 in which a receiver is provided with an antenna structure that includes a first antenna 102 and a second antenna 104 located a short known distance d apart such as illustrated in FIG. 1. In accordance with step 206, the receiver, or more specifically, the antenna structure is positioned in a known orientation at a known location with a clear view of the sky. The receiver then tracks the signals from the GNSS satellites in view and utilizes broadcast data and/or other information to determine the positions of the respective satellites. The system next determines the angles of incidence or arrival of the GNSS satellite signals at the vector $V_A$ that extends between the phase centers of the antennas in step 208. The system then computes the expected phase difference based on the angles of arrival and the known spacing of the antennas in step 210.

More specifically, the position coordinates of the GNSS satellite are known from the satellite signal broadcast data, associated almanac data and so forth. The system determines the angles of incidence θ from the geometry of the satellites and the antennas. For example, the system may calculate the cos φ term of eqn. 1 using eqn. 2, based on the known position and orientation of the antennas and the position coordinates of satellites. Using the calculated angles of incidence, the known wavelengths of the GNSS satellite carrier signals, the known distance between the antenna phase centers and a bias term that is determined as described above from, for example, signals from multiple satellites, the system calculates expected carrier phase differences. In the example, the system utilizes eqn. 1.

Next, at Step 212 the receiver measures the carrier phases of the GNSS satellite signals at the respective antennas. If the antennas are spaced apart by more than 1 wavelength of the GNSS satellite carrier signal, the system must resolve the integer carrier cycle ambiguities as part of the calculations of the measured carrier phase differences. Accordingly, the system may utilize known short baseline RTK operations to resolve the cycle ambiguities, and then calculate the measured phase differences by subtracting the measurements. Alternatively, the system may resolve the integer carrier cycle ambiguities in other known manners.

If the antennas are spaced apart by less than 1 wavelength of the carrier signal, i.e., on an ultra-short baseline, the integer cycle ambiguity resolution is essentially trivial in the sense that the ambiguities are associated with cycle rollovers. The cycle ambiguities are thus resolved based on the close proximity of the antennas, since the rollovers will provide only one solution that is within the span of the ultra-short baseline and various other solutions that can be readily rejected as outside of the span of the ultra-short baseline. The cycle rollovers may occur when the satellite signals are at particular angles of incidence, and thus, the system may incorporate cycle rollover compensation into its carrier phase difference operations for particular angles of incidence and otherwise use the measured carrier phase angles directly, to determine orientation. Accordingly, the RTK or other operations typically required to resolve the carrier cycle ambiguities need not be performed for the ultra-short baseline configuration, and the system operations are thus simplified.

In accordance with step 214, the system computes carrier phase difference errors by subtracting the calculated expected carrier phase differences from the measured carrier phase differences.

The carrier phase difference errors so determined are recorded at step 216. The process is repeated to collect additional data, as shown in step 218. The additional data may be collected by allowing the receiver to remain in a location for a number of hours, for example, twenty-four hours, such that the GNSS satellites move through their respective locations in the sky. At selected times or locations, carrier phase measurements are taken and measured carrier phase differences are determined, angles of arrival and expected carrier phase differences are calculated, and phase difference errors are recorded, to fill in the table.

Alternatively, if the data is sought to be obtained in a shorter period of time, the data can be collected by physically rotating the antenna structure by particular degree intervals, and performing the steps of obtaining the measured carrier phase differences, calculating the angles of arrival and expected carrier phase differences at respective antenna orientations, and determining the associated phase errors, and so forth.

Figure 3:
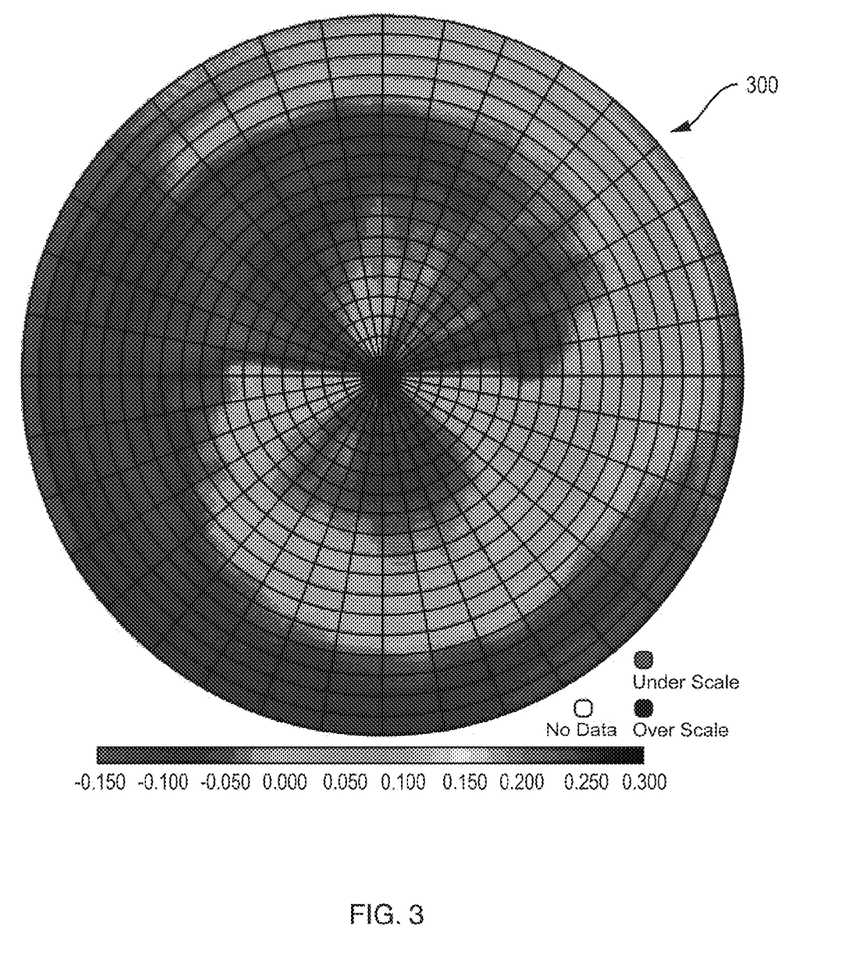
FIG. 3 is a schematic illustration of the phase map in polar coordinate form.

As shown in step 220, the phase error data are further sorted into table grid elements. In step 222 an average is taken for each set of data for each grid element. In accordance with step 224, the average value is stored in each grid cell element thus populating the table with figures of merit. Any empty cells can be populated by interpolating the data between neighboring cells as shown in step 226. The procedure ends in step 228 and the phase map/table 128 is thus formed. As is understood by those skilled in the art, other figures of merit, for example, the mean of the calculated error values or other values associated with the dispersion of the phase difference error values at common angles of incidence, may be used instead of or in addition to the average. Alternatively, or in addition, the figures of merit may include weightings for the values. For example, the values associated with angles of incidence for which there are relatively large dispersions may be deweighted and/or a sliding scale of weightings may be applied based on how widely dispersed the associated values are, in order to ensure that the values associated with wider dispersions have less effect on the calculations than the values associated with smaller dispersions. FIG. 3 illustrates a phase map 128 in which the carrier phase difference errors are represented in polar coordinate format.

As noted, the expected phase differences are computed using the angles of arrival that are calculated using the known locations and orientations of the rover antennas and the known position coordinates of the GNSS satellites. The carrier phase difference error is then obtained by subtracting the expected carrier phase difference from the measured carrier phase difference. The carrier phase difference errors are recorded for various angles of arrival and the steps are repeated until measurements have been collected for majority of table index cells, as shown in FIG. 3. Illustratively, the various sets of data are averaged or otherwise manipulated to obtain figure of merits for the phase difference error values for the respective grid cell elements. The look-up table is also built from the figure of merit values. If there are grid cells with no data, values can be computed by interpolation between or among neighboring cells containing valid data.

In accordance with an alternative embodiment of the invention, the phase map/table 128 may be generated using incoming signals from an RF signal generator (not shown). The antenna structure is thus positioned at a known distance and orientation with respect to the RF signal source, and the phase differences at the antennas with respect to the received RF signal are measured. The expected phase differences are calculated based on the angle of incidence of the RF signals relative to the vector $V_A$. The antenna orientation is then rotated by a predetermined amount, or the RF signal generator is moved by a predetermined angle, and the measured and expected phase differences are determined, and so forth.

In either map/table generation method, i.e., using the GNSS satellite signals or the signals from the RF signal generator, the grid size of the map/table is preferably proportional to the gradient of the measured phase difference errors. More specifically, the higher the gradient, the denser the table should be. Inversely, if the phase difference error changes very slowly across the measured space, then a sparser table can be used. Another consideration when determining grid spacing is the expected user accuracy requirement. If the requirement for phase measurement accuracy is high, then a denser grid will be required for the table. Notably, the change in the error value between adjacent grid cells should be significantly (e.g., half or quarter) smaller than the required user accuracy.

Alternatively, or in addition, the mathematical model may be used to represent the phase corrections. Accordingly, the calculated values are used to construct the model using, for example, techniques associated with spherical harmonic modeling. Similarly, a model may also be determined for the figures of merit. In operation, the table generated by the method of the present invention can be used in a procedure which is described with reference to the flow chart of FIGS. 4A and 4B. The steps are performed using an antenna structure in which the antennas are separated by more than one wavelength of the GNSS carrier, for example, separated by 1 or ½ meter.

Figure 4A:
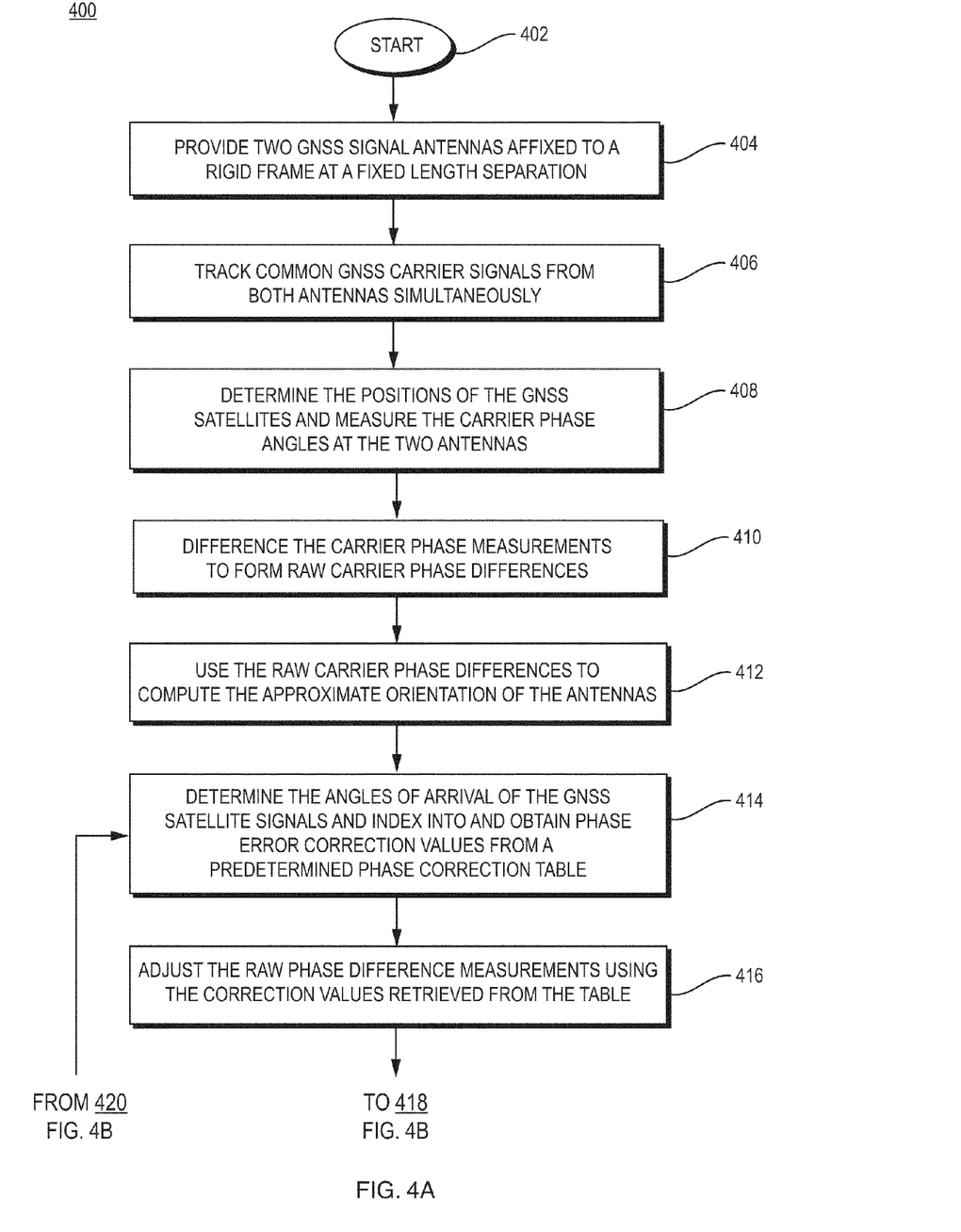
FIGS. 4A and 4B are a flow chart of a method of determining orientation of a short baseline receiver utilizing the phase map/lookup table.

The procedure begins at the start step 402 and continues to step 404 in which two GNSS signal antennas are affixed to a rigid frame at a fixed separation d. In accordance with step 406, the two antennas track common GNSS carrier signals simultaneously and the receiver determines its position using the signals from one or both antennas in a known manner. The system also determines the position coordinates of the GNSS satellite from the broadcast data and/or other well known means. The receiver then measures the carrier phase angles at the two antennas at periodic intervals (step 408).

In step 410, the system subtracts the pairs of carrier phase measurements to calculate measured, or raw, carrier phase differences. As appropriate, the system next resolves the integer carrier phase ambiguities using the carrier phase measurements in known short baseline RTK processing operations, and determines measured carrier phases for the two antennas. Using the raw phase differences, the receiver calculates an approximate orientation of the antennas in a known manner, for example, using eqn.1, as shown in step 412. As shown in step 414, the system uses the location of the GNSS satellite, determined as discussed above, to calculate angle of arrival of the GNSS satellite signals with respect to the calculated orientation of the antennas. The system then uses the angle of arrival to enter the phase map or look-up table and extract the phase difference error corrections.

Figure 4B:
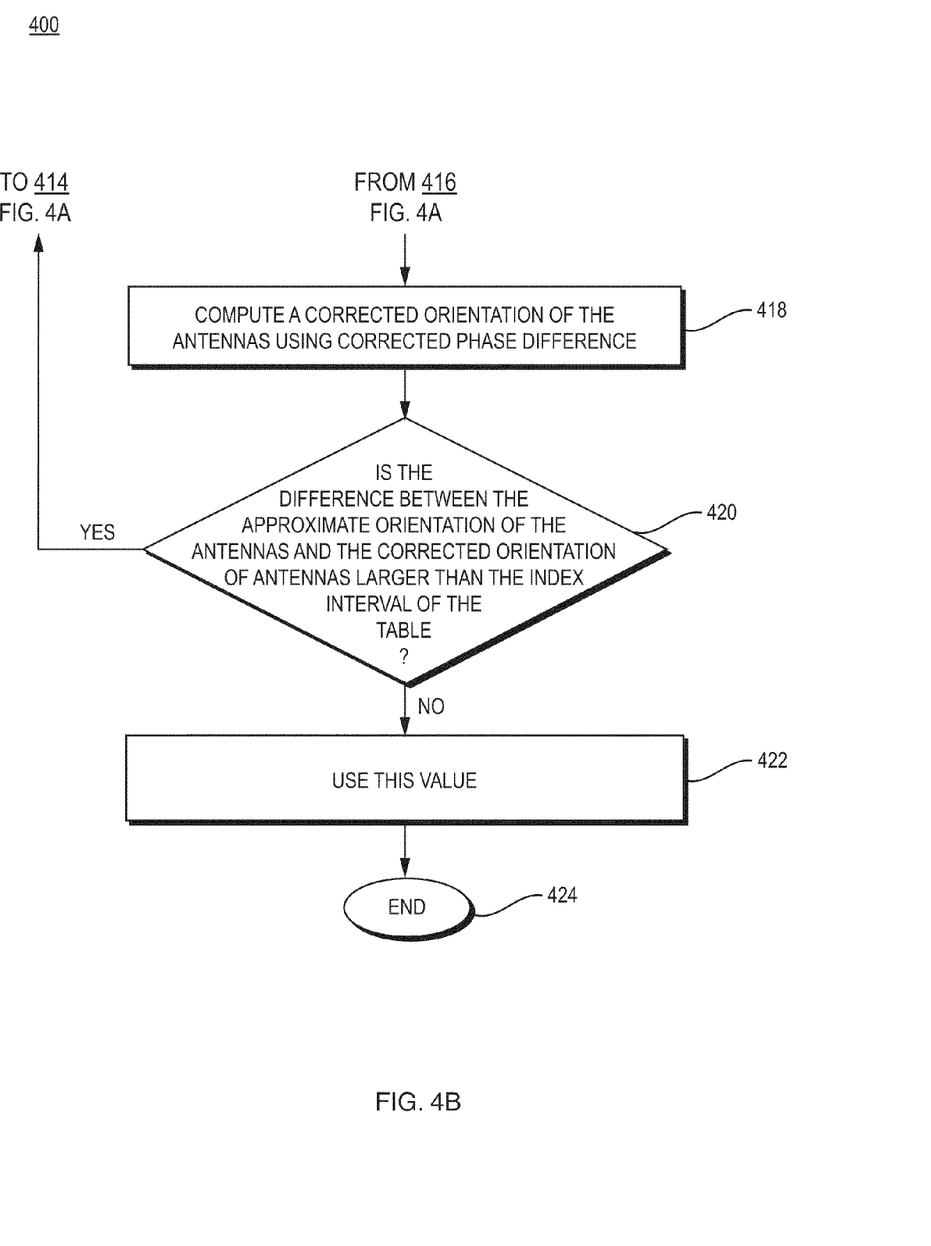

The system uses the phase difference error corrections retrieved from the table to adjust the raw phase difference measurements to compensate for phase distortion caused by multipath signals or other local RF effects, as shown in step 416. In the example, the retrieved value is combined with the phase difference value used to calculate the orientation. As appropriate, a calculated line bias term is also included in the adjustment, assuming either the bias term is not incorporated into the table or double differencing is not utilized. The system then recalculates the orientation of the antennas using the corrected phase difference values as shown in step 418. Decision step 420 checks whether the difference between the earlier calculated orientation of the antennas and the corrected orientation of the antennas is larger than the index interval of the table or grid size of the map. If so, steps 414-420 are repeated using the corrected orientation to determine updated angles of arrival, and so forth, and the iterations continue until the change in the corrected orientation is sufficiently small. The procedure continues to step 422, with the corrected orientation used as the actual orientation of the antennas, and the procedure ends at step 424.

The known distance d between the antennas 102 and 104 may be less than one wavelength of the GNSS satellite signal of interest, and thus, integer carrier cycle ambiguity is essentially trivial to resolve and thus complicated RTK procedures are not required. Rather, the measured carrier phase angles may be used directly, with cycle rollovers taken into account, as appropriate, to determine the raw phase difference. The step 408 is thus simplified. The closer spacing of the antennas, however, the more cross-talk may occur between them. The cross-talk signals adversely affect the calculation of carrier phase angle differences, since the cross-talk results in an apparent shift of the antenna phase centers toward one another. Indeed, some spacings may result in the two antennas "seeing" the same signals, and thus, tending to operate as a single antenna. The look-up mechanism 128 operates to compensate for the cross-talk, in addition to compensating for the adverse effects of multipath signals at the respective antennas and as appropriate the line bias associated with receiver operations, by providing corrections for the carrier phase distortions associated with the angles of arrival of the GNSS satellite signals at the antennas. Thus, the system need not determine individual carrier phase measurement errors for each of the antennas.

Figure 5:
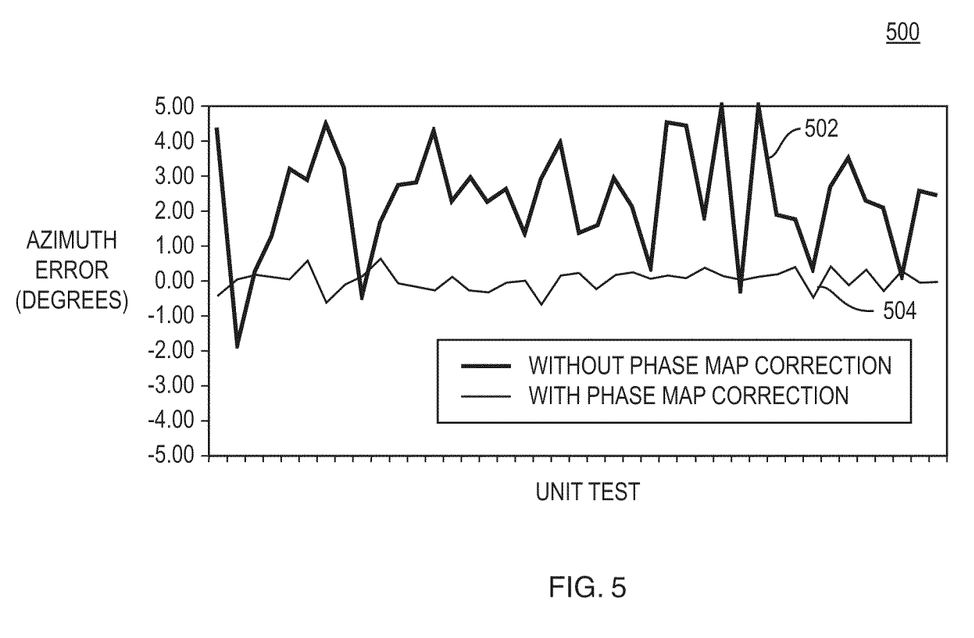
FIG. 5 is a plot of Azimuth error in degrees with and without use of the phase map/look-up table.

FIG. 5 depicts the results of azimuth or orientation determination with and without the use of the phase map or table 128. Curve 502 shows azimuth error in degrees without the use of the phase map or table 128. Curve 504 shows azimuth error in degrees when the phase map or table 128 is used in the calculations. As can be seen, the use of the phase map reduces the azimuth errors to near zero degrees and also stabilizes the errors to within a small range about zero degrees.

Alternatively, or in addition, the receivers may operate in a system that includes a data collection and processing center (not shown), and the receivers may send the carrier phase angle measurement data to the processing center for position and/or orientation determination. The receivers may thus be less complex since they need not process the measurement data. In such a system, the processing center may collect the carrier phase angle measurements and batch process the data to determine which carrier phase angle measurements are valid in the manner set forth in co-pending United State Patent Application Publication No. 2006/0012516 entitled METHOD FOR POSITIONING USING GPS IN A RESTRICTIVE COVERAGE ENVIRONMENT, which is assigned to a common Assignee and incorporated herein in its entirety by reference. The system then uses only the valid carrier phase angle measurements to calculate orientation.

Alternatively, or in addition, receivers in such a system may be simplified since the processor-intensive RTK processing to resolve integer carrier cycle ambiguities, as appropriate for the short baseline arrangements, may be performed in a data collection and processing center, with position and/or orientation information provided by the center to the receiver. As discussed, the RTK processing is not necessary for the ultra-short baseline arrangement.

Alternatively, the system may compute the orientation of the antennas with each set of measured carrier phase difference data collected. Such operations are of use when the antennas are located on a moving vehicle. With the antennas spaced apart by less than 1 wavelength of the carrier, resolution of integer carrier angle ambiguities is simplified to cycle rollover compensation, as discussed above, and complex RTK methods are not required to determine orientation, and the processing is thus much less complex and less time consuming.

The system may utilize an array of more than two antennas, and generate phase maps, look-up tables and/or mathematical models for all or selected pairs of antennas in the manners described above. The system then utilizes all or selected pairs of the antennas to determine the three dimensional orientation of the array in a manner similar to that described above for two dimensions.

Alternatively or in addition, the pitch and yaw of the array may, for example, be determined in a manner described in U.S. Pat. No. 6,211,821 B1 entitled Apparatus and Method for Determining Pitch and Azimuth From Satellite Signals, which
is incorporated herein in its entirety by reference. However, the carrier cycle ambiguity resolution is are handled as cycle roll over compensation for the ultra-short baselines, as discussed above. It should be understood that the present invention provides an advantageous method and system for determining the orientation of antennas arrays of two or more antennas using phase difference error look-up tables, maps and/or mathematical models, i.e., a look-up mechanism, that is generated in accordance with the present invention. The antennas in the dual antenna array are spaced apart by a distance d, however, the antennas in arrays with more than two antennas need not be equally spaced from each of their neighbor antennas.

The foregoing description has been directed to specific embodiments of the invention. It will be apparent, however, that other variations and modifications, such as combining system components such as processors or separating them into additional components, performing certain or all of the processing steps in software, hardware or firmware, performing steps out of order, and so forth, may be made to the described embodiments, with the attainment of some or all of the advantages of such. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A method of determining antenna orientation, comprising:
    A. providing two or more GNSS signal antennas at known separations from neighboring antennas and at an unknown orientation;
    B. tracking common GNSS carrier signals simultaneously at the antennas;
    C. making carrier phase measurements of GNSS satellite signals at the antennas and differencing the carrier phase measurements from all or selected pairs of antennas to form raw carrier phase differences;
    D. using the raw carrier phase differences to compute an approximate orientation of the antennas;
    E. determining angles of incidence of incoming GNSS satellite signals with respect to the computed approximate orientation of the antennas;
    F. using the angles of incidence to index into and obtain phase difference error correction values associated with respective pairs of antennas from an associated lookup mechanism consisting of one or more associated phase error correction maps, lookup tables and models;
    G. adjusting the raw carrier phase differences using the phase error correction values obtained from the lookup mechanism;
    H. computing a corrected orientation of the antennas using the adjusted phase differences;
    I. determining whether the difference between the calculated orientation of the antennas and the corrected orientation of the antennas is larger than a pre-determined threshold, and if the difference is larger, using the corrected orientation as the calculated orientation and determining angles of incidence of incoming GNSS satellite signals with respect to the calculated orientation of the antennas and repeating steps (F) through (I) until the difference is no longer larger than the threshold.

2. The method of determining antenna orientation of claim 1 further comprising:
    collecting raw carrier phase difference data over a period of time;
    batch processing the data; and
    solving for the orientation of the antennas.

3. The method of determining antenna orientation of claim 1 further comprising:
    collecting sets of raw carrier phase difference data once a period of time;
    computing orientation with each set of raw carrier phase difference data to determine a direction of a moving vehicle.

4. A system for determining antenna orientation comprising:
    (A) two or more GNSS signal antennas affixed to a rigid frame at known small distances of separation, the antennas and the rigid frame at an unknown orientation;
    (B) a look-up mechanism indexed to provide phase difference error values based on angles of incidence of the GNSS satellite signals at the antennas; and
    (C) a receiver coupled to the antennas and adapted to track common GNSS carrier signals from each of the antennas and measure carrier phase angles of said GNSS signals received at the antennas, the receiver being further adapted to calculate an approximate antenna orientation based on raw carrier phase differences at the antennas and calculate angles of incidence of GNSS satellite signals based on the calculated orientation, the receiver further adapted to the look-up mechanism based on the calculated angles of incidence to retrieve phase difference error correction values and utilizing the retrieved values to correct the calculated approximate orientation to compensate for phase distortion.

5. The system of claim 4 wherein the look-up mechanism is constructed as one or more look-up tables.

6. The system of claim 4 wherein the look-up mechanism is constructed as one or more mathematical models.

7. The system for claim 4 wherein the look-up mechanism is constructed as one or more phase maps.

8. The system of claim 4 wherein the receiver further resolves integer carrier cycle ambiguities before calculating the carrier phase differences.

9. The system of claim 8 wherein the receiver calculates the carrier phase differences by subtracting the measured carrier phase angles.

10. The system of claim 4 wherein
    the antennas are located within one wavelength of the carrier signals from neighboring antennas;

the receiver compensates for cycle rollover for selected signal angles of arrival before calculating the carrier phase differences by subtracting the associated carrier phase angles, and for the signals at other angles of arrival calculates the carrier phase differences by subtracting the measured carrier phase angles.

11. The method of claim 1 wherein the phase difference error map or look up table for a GNSS satellite system, are calculated by:

i. providing at a known position and orientation an antenna structure having at least a first antenna and a second antenna positioned a known distance apart;

ii. computing angles of arrival of GNSS satellite carrier signals with respect to vectors that extend between phase centers of one or more pairs of the antennas;

iii. computing expected phase differences based on the computed angles of arrival;

iv. determining a measured carrier phase difference from carrier phase measurements at the antennas;

v. differencing the expected carrier phase difference from the measured phase difference to produce carrier phase difference error values; and vi. recording the phase difference error values and corresponding angles of arrival.

12. The method of claim 11 further comprising:

repeating (i) through (vi) with different angles of arrival; and generating a lookup mechanism from the recorded phase difference error values and angles of arrival.

13. The method of claim 12 wherein the lookup mechanism for a given pair of antennas is generated by sorting the phase difference error data into table grid cell elements based on the angles of arrival.

14. The method of claim 12 wherein the lookup mechanism is one or more mathematical models.

15. The method of claim 12 wherein the lookup mechanism further includes one or more lookup figures of merit that are based on the dispersions of phase difference error values at common angles of incidence.

16. The method of claim 11 further comprising repeating (i) through (vi) at different times of day, allowing the GNSS satellites to move to different locations in the sky.

17. The method of claim 11 further comprising repeating (i) through (vi) while moving the antenna structure to various orientations.

18. The method of claim 15 wherein the figures of merit are one of averages and means.

19. The method of claim 15 wherein the figures of merit de-weight the values associated with larger dispersions.

20. The method of claim 11 wherein the lookup mechanism is a phase map and the map grid sizes are proportional to gradients of the phase difference errors, with smaller grid sizes used for higher gradients.

21. The method of claim 20 wherein the grid sizes are based also on accuracy requirements, with smaller grid sizes utilized for greater accuracy requirements.

22. The method of claim 1 further including incorporating into the table line biases calculated using phase difference values for respective pairs of antennas across multiple satellites.

23. The system of claim 4 wherein the receiver further calculates line biases associated with the GNSS antennas and corrects the calculated orientation to compensate for the phase distortion associated with the line biases.

24. The system of claim 23 wherein the receiver calculates the line biases periodically.

25. The method of claim 1 further including double differencing the measured phase differences to eliminate line biases associated with the multiple antennas.

26. The method of claim 1 wherein the antennas are provided on a rigid frame and receive multipath signals reflected from the frame, and the obtained phase difference error correction values are associated also with the multipath signals received by respective pairs of antennas.

27. The method of claim 1 further including correcting the calculated orientation to compensate for phase distortion associated with line biases.

28. The system of claim 4 wherein the receiver is further adapted to repeatedly determine if the calculated orientation and the corrected orientation differ by more than a predetermined threshold and if so utilize the corrected orientation as the calculated orientation and calculate angles of incidence based on the calculated orientation, re-enter the look-up mechanism based on the calculated angles of incidence and retrieve phase difference error correction values and utilize the values to correct the calculated orientation.

* * * * *

UNITED STATES PATENT AND TRADEMARK OFFICE
CERTIFICATE OF CORRECTION

PATENT NO. : 8,633,854 B2  Page 1 of 1
APPLICATION NO. : 12/579481
DATED : January 21, 2014
INVENTOR(S) : Patrick C. Fenton It is certified that error appears in the above-identified patent and that said Letters Patent is hereby corrected as shown below:

In the Claims:
Claim 4, col. 10, line 48 should read:
further adapted to enter the look-up mechanism based on the Signed and Sealed this
Fourteenth Day of October, 2014

Michelle K. Lee
*Deputy Director of the United States Patent and Trademark Office*